No. 766,036. PATENTED JULY 26, 1904.
H. HARTING.
LENS.
APPLICATION FILED FEB. 17, 1904.
NO MODEL.
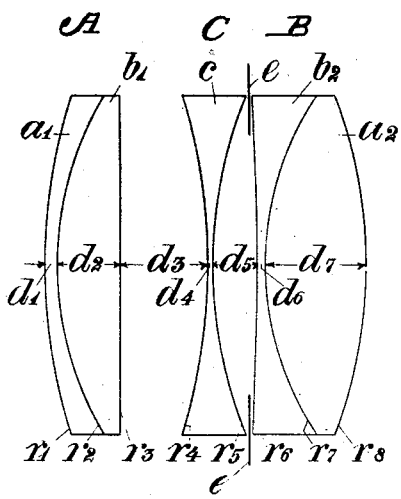

No. 766,036. Patented July 26, 1904.

UNITED STATES PATENT OFFICE.

HANS HARTING, OF BRUNSWICK, GERMANY.

LENS.

SPECIFICATION forming part of Letters Patent No. 766,036, dated July 26, 1904.

Application filed February 17, 1904. Serial No. 193,986. (No model.)

*To all whom it may concern:*

Be it known that I, HANS HARTING, director, a subject of the Emperor of Germany, residing at Brunswick, Duchy of Brunswick, Empire of Germany, have invented certain new and useful Improvements in Lenses, of which the following is a specification.

Chromatically, spherically, and astigmatically corrected lens systems are known in which a third-lens system, which is symmetrical in itself and symmetrical to the outer systems, is placed between two symmetrical lens systems composed of at least two lenses, (crown and flint,) which lens systems both simultaneously contain crown-glass of higher or crown-glass of lower refraction than the flint-glass, the lenses of which third-lens system (which lenses face the two outer lens systems) each form a glass pair with the lenses which face them of the outer systems, in which glass pair the glass with the smaller color dispersion has an index of refraction larger than or approximately equal to that of the other.

Now this invention has for its object such a modification of such a lens system as allows in addition to a good correction of optical defects also a good correction of the remaining aberration to be effected and also a sharp, brilliant, and level picture over a wide field of vision with a relatively wide objective. This is attained by the converging and diverging lenses in the two outer systems having different positions with respect to the middle system—that is to say, the converging and diverging lenses of the outer systems being arranged unsymmetrically to the central system. The number of the lenses in the two outer systems may also be different.

Referring to the drawing, A denotes one of the outer systems, B the other outer system, and C the middle system. In the outer system A the diverging lens $a'$ is located on the outside and the converging lens $b'$ on the inside. In the outer system B the diverging lens $b^2$ is located reversed on the inner side and the converging lens $a^2$ on the outer side. The central or middle system C can at pleasure consist of one single lens or of several lenses. Both of the outer systems A and B must consist at the least of two lenses, of which one must be crown-glass and the other flint-glass. There can also be other lenses in these systems in addition. If in system A the crown-glass lens has a higher refraction than the flint-glass lens, then in system B the crown-glass lens must also have a higher refraction than the flint-glass lens; but if in system A the crown-glass lens has a lower refraction than the flint-glass lens then in said system B the crown-glass lens must have a lower refraction than the flint-glass lens. If in said system A the diverging lens is placed on the outside and the converging lens on the inside, then in said system B the diverging lens must be placed on the inside and the converging lens on the outside. This improved construction has also the advantage that there is greater choice of available kinds of glass than the older type of lens hereinbefore mentioned allows.

A form of construction shown in the accompanying drawing will now be explained as an example.

If the eight different radii of curvature of the lenses be assumed to be indicated as shown in the drawing by $r_1$ $r_2$ $r_3$ $r_4$ $r_5$ $r_6$ $r_7$ $r_8$ and the lens thicknesses or air-space measured on the optical axis by $d_1$ $d_2$ $d_3$ $d_4$ $d_5$ $d_6$ $d_7$, the following equivalents result, for instance, for an equivalent focal length of $f_D = 100$:

$r_1 = + 34.99, \quad d_1 = 0.67.$ $r_2 = + 20.83, \quad d_2 = 4.17.$ $r_3 = \infty, \quad d_3 = 5.83.$ $r_4 = - 36.67, \quad d_4 = 0.42.$ $r_5 = + 28.25, \quad d_5 = 3.17$ $r_6 = - 266.6, \quad d_6 = 0.42.$ $r_7 = + 19.16, \quad d_7 = 6.67.$ $r_8 = - 30.19.$ Diameter of aperture, 22.2; relative aperture, 1:4.5, $(f/4.5.)$ The stop $e$ is situated in the second air-space.

The equivalents of the kinds of glass (indices of refraction for the frauenhofer lines D and $G' = H\gamma$) are then the following:

For $a_1$: $n_D = 1.54990$, $n_{G'} = 1.56547$, (silicate light flint.)

For $b_1$: $n_D = 1.61340$, $n_{G'} = 1.62736$, (heaviest baryta crown.)

For $c$: $n_D = 1.55019$, $n_{G'} = 1.56597$, (silicate light flint.)

For $b_2$: $n_D = 1.53780$, $n_{G'} = 1.55143$, (silicate glass.)

For $a_2$: $n_D = 1.61340$, $n_{G'} = 1.62736$, (heaviest baryta crown.)

I declare that what I claim is—

A lens system, consisting of a central system and two outer systems, each of the outer systems having a converging and diverging lens, one of said lenses being of crown-glass and the other of flint-glass the refraction of which is different in the same sense in both outer systems, said converging and diverging lenses of the outer systems being arranged unsymmetrically to the central system.

In testimony whereof I have hereunto set my hand in presence of two subscribing witnesses.

HANS HARTING.

Witnesses:
    JULIUS SECKEL,
    WILHELM LEHRNE.